Oct. 9, 1962 K. T. IWAMOTO 3,057,338
FISHING GUN
Filed June 13, 1960
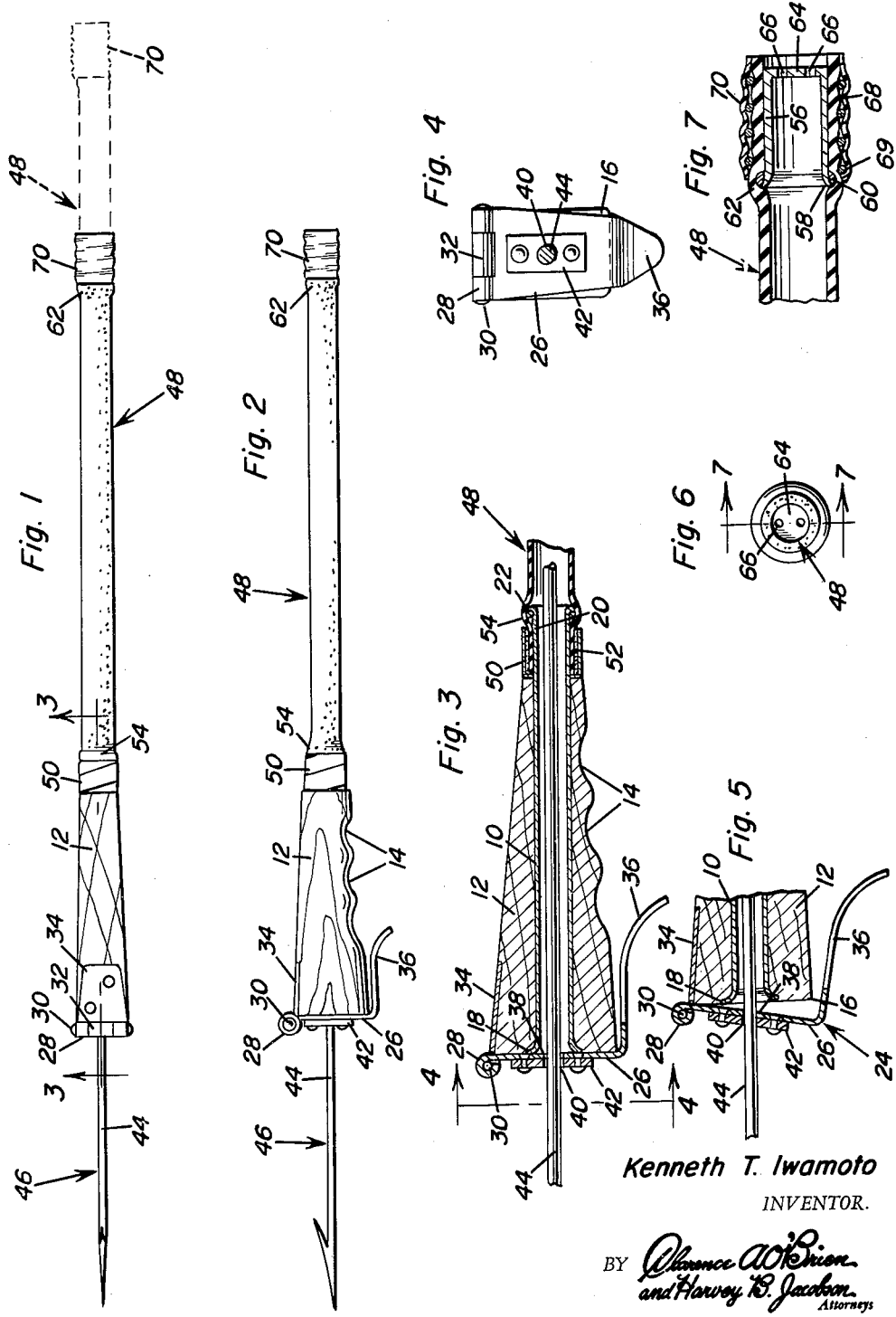
Kenneth T. Iwamoto
INVENTOR.
BY *Clarence A. O'Brien*
*and Harvey B. Jacobson*
Attorneys

United States Patent Office 3,057,338
Patented Oct. 9, 1962

3,057,338
FISHING GUN
Kenneth T. Iwamoto, R.R. 1, Box 60, Maui, Hawaii
Filed June 13, 1960, Ser. No. 35,518
5 Claims. (Cl. 124—22)

This invention relates to an improved spear handling and shooting gun which is expressly, but not necessarily, designed and reliably adapted for use by a fisherman when engaged in the currently popular sport of underwater fishing.

An object of the invention is to structually and functionally improve upon spear driving guns and the like commonly used. To this end, the gun offers several improvements.

One improvement has to do with novel means for imparting the desired impetus or thrust and effectively applying the impelling force to a conventional-type spear. More specifically, this means comprises an elongated flexibly resilient tube the forward end of which is connected by a fluid-tight joint to the rear end of a suitable spear supporting and aiming barrel. Experience has shown that best results are had when using a stout surgical rubber tube. The latter, when distended and then released, forcibly projects the spear forwardly and accurately toward the target aimed at.

An equally important improvement resides in closing the rearward or proximal end of the tube with a brass or an equivalent capping cup, the bottom of the cup having water escape ports to prevent undesirable water compression in the tube.

Briefly summarized, the invention is characterized by the aforementioned elongated surgical rubber tube which is such that it may be stretched lengthwise and elongated and placed under tension when the shaft of the spear has been passed through the barrel and passage of the tube with the rear end thereof brought to bear against the end thrust and impelling cap embodied in the rear end of the tube. A rigid barrel is mounted in the complemental wooden or equivalent handle. The handle is suitably shaped to facilitate grasping the same securely in one hand. A simple L-shaped trigger is hingedly mounted on the forward or distal end of the handle and the lateral end portion thereof provides an appropriate finger-piece. The central portion of the plate of the trigger has a hole therein for passage of the shaft of the spear and a cleat is riveted on the front of the plate to reinforce it. By canting the trigger plate the embraced portion of the shaft of the spear is frictionally but releasably gripped and the gun is thus cocked and readied for use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the improved fishing gun illustrating the extended position of the capped end of the tube when the gun is cocked.

FIG. 2 is a side elevational view of the same.

FIG. 3 is a view in section and elevation on a slightly enlarged scale showing certain of the significant details.

FIG. 4 is a section on the line 4—4 of FIG. 3.

FIG. 5 is a view similar to FIG. 3 and in section and elevation and illustrating the cocked position of the spear holding and releasing trigger.

FIG. 6 is an end view of the rearward end of the tube, for example a view observing FIG. 7 in a direction from right to left.

FIG. 7 is a section on a slightly enlarged scale taken on the plane of the section line 7—7 of FIG. 6.

The metal or equivalent open-ended elongated barrel or cylinder is denoted by the numeral 10 (FIG. 3) and it will be observed that this barrel is fitted in and lines the bore or passage of an elongated wooden or equivalent block or sleeve 12 which constitutes a hand-grip or handle means. This block is preferably non-circular in cross-section so that it may be securely grasped by the user's hand, and is reduced in cross-section toward the rearward end and the underneath side is notched as at 14 to provide appropriate fingergrips. The forward or distal end 16 of the handle is substantially flat. The corresponding end of the barrel is flared outwardly forming a bell-mouth-flange 18 and is suitably fastened in place. The opposite or rearward end portion of the barrel projects as at 20 beyond the corresponding end of the handle where it terminates in an encircling bead 22.

The aforementioned L-shaped trigger or latch is denoted by the numeral 24 and comprises a substantially flat plate portion 26 the upper end of which is provided with knuckles 28 hingedly mounted on a pintle 30 carried by the central knuckle 32 (FIG. 4) of the attaching and retaining leaf 34 fixed on the top side of the handgrip. The laterally rearwardly directed end portion of the trigger is arranged in a conveniently accessible and releasable position adjacent the finger notches 14 and is fashioned into a suitable trippable finger-piece 36. It will also be noticed in FIGS. 3 and 5 that the central portion of the plate is provided with a hole or opening 38 which is aligned with a similar hole or opening 40 in a rigidifying cleat 42 which is riveted or otherwise fastened in place on the plate portion as shown. FIG. 3 shows the plate against the end 16 of the handle, this being the tripped position of the trigger. On the other hand, FIG. 5 shows the oblique angled or canted position of the plate portion in which position the holes 38 and 40 function to frictionally grip the staff 44 of the spear 46. It may be mentioned here that the spear is a conventional one.

The impetus imparting and forward impelling force is achieved through the medium of a suitably elongated stout surgical rubber tube 48. The forward end portion of the tube as shown in FIG. 3 encircles the beaded extending end portion 20 of the barrel and is securely fastened in place by a wrapping of twine or cord as at 50 which in turn is covered and secured in place by a plastic or an equivalent tape 52. It will be noticed that the bead 22 crimps or bends the rubber tube in a manner to provide an effective and reliable joint, that is, a joint which is fluid-tight. The tube 48 is appreciably longer than the barrel 10, is limber when not in use, is wholly free and unrestrained when not in use and can be freely coiled for compactness and convenience in packaging.

The rearward or proximal end of the tube is substantially closed in the manner shown with particularity in FIG. 7. This end of the tube is capped. In other words, a cap-like brass cup (a brass shell) is provided and the body or shell portion 56 is fitted telescopically into the tube and the forward end is flared outwardly as at 58 and is embraced by a ring of lead or the like 60 providing an assembling and retaining bead. Here again this bead construction bends or crimps the rubber tube as at 62. The cup or cap is completely enclosed in the tube and the bottom thereof as at 64 is provided with vents or ports 66 which function to allow water to escape therethrough in a manner to minimize undesirable water compression in the tube.

Experience has shown that this type of a fishing gun is efficient and accurate in performance within ten feet of a target in the water. It is not necessary to attach a safety lock on the gun inasmuch as it can be very easily cocked just before the user is ready to shoot at the target. By tensioning the tube 48 in the manner shown in dotted lines in FIG. 1 the gun is ready for use and assuming that the trigger is in the cocking or set position seen in FIG. 5 all that is necessary is to trip the finger-piece 36 and the spear is shot forcibly at the target, usually a fish.

The end portion 68 (FIG. 7) of the tube is securely wrapped as at 69 and is covered with a sleeve or tape windings as at 70.

The foregoing is consired as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spear shooting gun for underwater fishing comprising an elongated normally limber imperforate rubber tube adapted to be stretched lengthwise, elongated and placed under tension, said tube being relatively long and, when not in use, freely bendable and coilable in any direction, the rearward end of said tube being free and unrestrained and having a rigid end-thrust member securely bound and fixed therein and provided with uncovered constantly open ports for passage of water entering the tube when the gun is in use, a rigid barrel securely joined at its rearward end to the forward end of said tube and having means for gripping, holding and aiming the barrel, and trigger means, said gripping means comprising a sleeve substantially commensurate in length with the barrel, the forward end of the sleeve being flat and flush with the forward end of the barrel, said trigger means comprising a flat plate having one end hingedly mounted on the forward end of said sleeve, its body portion opposed to the forward ends of the sleeve and barrel respectively and having a hole alignable with the bore of the barrel, the other end of said plate having an accessible readily actuatable finger-grip, said finger-grip being adapted to assume a position approximately parallel to a lengthwise surface of said sleeve when being used, whereby the user may wrap his hand around the aforementioned sleeve and simultaneously around the fingergrip in a manner to accurately aim the barrel and expeditiously release the finger-grip.

2. A spear gun for use by an underwater fisherman comprising an elongated sleeve-like handle having a flat forward end, an elongated barrel fitted into the bore of said sleeve with its forward end flush with the corresponding forward end of the handle, the rearward end of the barrel projecting beyond the rearward end of the handle and terminating in a bead, an L-shaped trigger having a flat plate portion and a lateral finger-grip, said plate portion adapted to abut the forward ends of the handle and barrel, an upper end of said plate portion being pivotally mounted on the handle in a manner to allow the plate portion to be angled forwardly when set for use and to swing toward the handle and barrel when triggered by the finger-grip, said plate portion having a reinforced opening alignable with the axis of the barrel and serving to permit the shaft of the spear to pass therethrough and through the bore of the barrel, an elongated flexibly resilient and elastically stretchable tube having its forward end joined to the beaded rearward end of the barrel, and a rigid cap secured in the rearward end of the tube and having a spear abutting and impelling end provided with a plurality of constantly open ports.

3. A spear shooting gun expressly designed and properly adapted for underwater fishing comprising a relatively long normally limber imperforate flexibly resilient rubber tube fully exposed and coilable and adapted to be stretched lengthwise, elongated and thus placed under tension when the shaft of a spear is loaded therein, the rearward end of said tube being unencased and free and having a rigid end thrust member fixed therein and provided with constantly open uncovered ports for passage of a column of water that would, if not released, be objectionably trapped in the tube when in use, a rigid elongated barrel of a length less than the length of said tube axially aligned with and joined at its rearward end to the forward end of said tube and having means for gripping, holding and aiming the barrel, said means being non-circular in cross-section and provided with anti-slipping finger-seating notches, trigger means pivotally mounted on the forward end of said barrel, said rigid thrust member comprising a short brass shell providing a receiver for the rear end of the shaft of a fish shooting spear, the bottom of said shell being disposed rearwardly and having the aforementioned ports provided therein, said shell fitted telescopically into the cooperating end of the tube and having an externally encircling bead which crimps that portion of the tube which embraces the same, and a portion of the tube snugly encasing the shell being secured thereto by means which is securely wrapped around said tube portion.

4. The structure defined in claim 3, and wherein the rearward end of said barrel is likewise fitted telescopically into the forward end of said tube, provided with a tube-crimping bead and said forward end being wrapped and taped securely in place.

5. A spear shooting gun for underwater fishing comprising, in combination, a relatively long normally limber flexibly resilient imperforate tube for telescopic reception of the shaft portion of a spear and adapted to be stretched lengthwise and in this manner placed under tension when the spear is set for use and the tube is thus cocked and readied to function, a thrust member fixedly embodied in a fluid-tight manner wholly within the rearward end of said tube, the bottom of said thrust member having a plurality of constantly open water and pressure relief ports therein, a rigid elongated barrel telescoping into and having a rearward end securely connected in a fluid-tight manner to a cooperating forward end of said tube, a rigid sleeve constituting a non-circular hand-grip and having an axial lengthwise open-ended bore, the major portion of said barrel being fastened in and lining said bore, a rearward end portion of the barrel projecting beyond the corresponding end portion of the sleeve, the forward end portion of said sleeve being disposed at right angles to the axis of the bore and barrel, respectively, and an L-shaped trigger having a plate portion and a lateral finger-grip, said plate portion adapted to abut the forward ends of the sleeve and barrel respectively, an upper end of the plate being pivotally mounted on a corresponding end of the sleeve in a manner to allow the plate to be angled forwardly when set into use and to swing rearwardly toward the handle and barrel when triggered by actuating said finger-grip, said trigger being free of connection with said tube, and said tube being free of external or other encumbering component parts.

References Cited in the file of this patent

UNITED STATES PATENTS

| 2,762,358 | Kinnaman | Sept. 11, 1956 |
| 2,896,604 | Rebikoff | July 28, 1959 |

FOREIGN PATENTS

| 926,806 | France | Apr. 21, 1947 |
| 1,076,086 | France | Apr. 14, 1954 |